(12) United States Patent
   Oshiumi

(10) Patent No.: US 9,663,094 B2
(45) Date of Patent: May 30, 2017

(54) DRIVING DEVICE FOR HYBRID VEHICLE

(71) Applicant: TOYOTA JIDOSHA KABUSHIKI KAISHA, Toyota-shi, Aichi-ken (JP)

(72) Inventor: Yasuhiro Oshiumi, Gotemba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/787,861

(22) PCT Filed: Apr. 30, 2013

(86) PCT No.: PCT/JP2013/062638
§ 371 (c)(1),
(2) Date: Oct. 29, 2015

(87) PCT Pub. No.: WO2014/178117
PCT Pub. Date: Nov. 6, 2014

(65) Prior Publication Data
US 2016/0082941 A1    Mar. 24, 2016

(51) Int. Cl.
*B60W 10/00* (2006.01)
*B60W 10/02* (2006.01)
(Continued)

(52) U.S. Cl.
CPC ............. *B60W 10/02* (2013.01); *B60K 6/387* (2013.01); *B60K 6/445* (2013.01); *B60W 10/08* (2013.01); *B60W 20/00* (2013.01); *B60W 20/40* (2013.01); *B60W 2710/027* (2013.01); *B60W 2710/083* (2013.01); *Y02T 10/6239* (2013.01);
(Continued)

(58) Field of Classification Search
CPC ...... B60W 10/02; B60W 10/08; B60W 10/00; B60W 20/40; B60W 20/00; B60W 2710/027; B60W 2710/083; Y10T 477/26
See application file for complete search history.

(56) References Cited

U.S. PATENT DOCUMENTS 6,054,776 A * 4/2000 Sumi ................... B60K 6/383
                                                        290/17
7,698,042 B2 * 4/2010 Shimizu ............... B60K 6/445
                                                        475/2

(Continued)

FOREIGN PATENT DOCUMENTS

JP    2012-201255 A    10/2012
JP    2012-224243 A    11/2012
JP    2012-224244 A    11/2012

*Primary Examiner* — James M Dolak
(74) *Attorney, Agent, or Firm* — Andrews Kurth Kenyon LLP

(57) ABSTRACT

Provided is a driving device for a hybrid vehicle including a differential mechanism, a first rotating machine and a second rotating machine connected to the differential mechanism, and an engine connected to a predetermined rotating element of the differential mechanism via a clutch, in which torque control for the first rotating machine and the clutch is executed until a rotation speed of the predetermined rotating element reaches a target rotation speed in a case where the engine is started in a state where the clutch is released and a differential torque between torque balanced with respect to a torque command value with respect to the clutch and a torque command value with respect to the first rotating machine is within a predetermined range during the torque control.

5 Claims, 9 Drawing Sheets

(51) Int. Cl.
*B60K 6/445* (2007.10)
*B60W 10/08* (2006.01)
*B60K 6/387* (2007.10)
*B60W 20/40* (2016.01)
*B60W 20/00* (2016.01)

(52) U.S. Cl.
CPC ........ *Y02T 10/7258* (2013.01); *Y10S 903/914* (2013.01); *Y10S 903/93* (2013.01)

(56) References Cited

U.S. PATENT DOCUMENTS

| | | | | |
|---|---|---|---|---|
| 7,734,401 B2 * | 6/2010 | Joe | ............................ | B60K 6/365 180/65.1 |
| 8,282,526 B2 * | 10/2012 | Heap | ...................... | B60K 6/365 477/180 |
| 8,414,451 B2 * | 4/2013 | Hisada | ................... | B60K 6/387 475/5 |
| 8,489,293 B2 * | 7/2013 | Heap | ........................ | B60K 6/26 477/120 |
| 8,506,451 B2 * | 8/2013 | Takami | .................. | B60K 6/387 477/20 |
| 8,587,237 B2 * | 11/2013 | Kobayashi | ............... | B60K 6/48 280/108 |
| 8,591,361 B2 * | 11/2013 | Hisada | ................... | B60K 6/387 180/65.235 |
| 8,594,876 B2 * | 11/2013 | Takami | ................... | F02D 29/02 701/22 |
| 8,821,341 B2 * | 9/2014 | Bowman | ............... | B60W 20/00 477/3 |
| 9,005,078 B2 * | 4/2015 | Hayashi | ................. | B60K 6/365 477/5 |
| 9,358,871 B2 * | 6/2016 | Harada | ................... | B60K 6/445 |
| 2012/0245774 A1 | 9/2012 | Takami et al. | | |
| 2012/0270697 A1 | 10/2012 | Takami et al. | | |
| 2012/0270698 A1 | 10/2012 | Hisada et al. | | |

* cited by examiner

| TRAVELING MODE | MG1 | MG2 | CL1 | CL2 | BK1 | NOTE |
|---|---|---|---|---|---|---|
| FIRST TRAVELING MODE | - | ○ | - | - | ○ | MG2 SINGLE DRIVING |
| SECOND TRAVELING MODE | ○ | ○ | - | ○ | - | BOTH MG1&2 DRIVING | ural
DRIVING DEVICE FOR HYBRID VEHICLE

CROSS-REFERENCE TO RELATED APPLICATION

This is a national phase application based on the PCT International Patent Application No. PCT/JP2013/062638 filed Apr. 30, 2013, the entire contents of which are incorporated herein by reference.

TECHNICAL FIELD

The invention relates to a driving device for a hybrid vehicle.

BACKGROUND ART

An engine-starting technique based on clutch engagement has been known in the related art. For example, PTL 1 discloses a technique relating to a driving device for a vehicle provided with a rotation speed control unit that performs rotation speed control so as to allow the rotation speed of a first rotating electrical machine MG1 to correspond to a start target value Ni when an internal combustion engine E is started in a state where a friction engagement device CL remains released, an engagement control unit that executes asynchronous engagement control for the engagement of the friction engagement device CL in an asynchronous state and allows the friction engagement device CL to be directly engaged on condition of the execution of the rotation speed control, and a start command unit that commands the start of the internal combustion engine E on condition that the friction engagement device CL is in the state of direct engagement, in which the rotation speed control unit sets the start target value Ni for the rotation speed at the direct connection, which is the rotation speed of the internal combustion engine E in the state of direct engagement, to become a start rotation speed Nf that is set within a start-permitted rotation speed range R which is a rotation speed range allowing the start of the internal combustion engine E.

CITATION LIST

Patent Literature

PTL 1: Japanese Patent Application Publication No. 2012-201255

SUMMARY OF THE INVENTION

It is desirable that an excessive increase in electric power consumption during the start of the engine is inhibited. In a case where the rotation speed control regarding a rotating machine is performed, for example, electric power consumption by the rotating machine may increase more than expected due to a variation of the coefficient of friction of a clutch.

An object of the invention is to provide a driving device for a hybrid vehicle that is capable of inhibiting an excessive increase in electric power consumption during the start of an engine.

According to an aspect of the invention, there is provided a driving device for a hybrid vehicle including a differential mechanism, a first rotating machine and a second rotating machine each connected to the differential mechanism, and an engine connected to a predetermined rotating element of the differential mechanism via a clutch, in which the driving device executes torque control for the first rotating machine and the clutch until a rotation speed of the predetermined rotating element reaches a target rotation speed in a case where the engine is started in a state where the clutch is released, a torque command value with respect to one of the first rotating machine and the clutch and a torque command value with respect to the other one of the first rotating machine and the clutch change in response to each other during the torque control, and a differential torque between the torque command value with respect to the other one of the first rotating machine and the clutch and torque balanced with the torque command value with respect to one of the first rotating machine and the clutch is within a predetermined range during the torque control.

In the driving device for a hybrid vehicle, it is preferable that the differential torque during the torque control is based on a magnitude relation between the target rotation speed of the predetermined rotating element available when the clutch is fully engaged and the rotation speed of the predetermined rotating element available when the torque control is initiated and the differential torque is a value on a side approximating the rotation speed of the predetermined rotating element to the target rotation speed.

In the driving device for a hybrid vehicle, it is preferable that a magnitude of the torque command value until a rotation speed of the engine passes through a resonance band exceeds a magnitude of the torque command value after the passage through the resonance band in the torque control, the differential torque is set after the rotation speed of the engine passes through the resonance band in a case where the rotation speed of the predetermined rotating element available when the torque control is initiated is lower than the target rotation speed, and the differential torque is set even before the rotation speed of the engine passes through the resonance band in a case where the rotation speed of the predetermined rotating element available when the torque control is initiated is higher than the target rotation speed.

In the driving device for a hybrid vehicle, it is preferable that torque inhibiting an output torque fluctuation attributable to the engagement of the clutch is output by the second rotating machine, the inhibiting torque is determined based on the torque command value with respect to the clutch when the clutch has yet to be fully engaged, and the inhibiting torque is determined based on the torque command value with respect to the first rotating machine after the clutch is fully engaged.

In the driving device for a hybrid vehicle, it is preferable that the differential torque is set by increasing or decreasing the torque command value with respect to the first rotating machine with respect to the torque balanced with the torque command value with respect to the clutch and the torque command value with respect to the first rotating machine becomes the torque balanced with the torque command value with respect to the clutch when the rotation speed of the predetermined rotating element reaches the target rotation speed.

The driving device for a hybrid vehicle according to the invention executes the torque control for the first rotating machine and the clutch until the rotation speed of the predetermined rotating element reaches the target rotation speed in a case where the engine is started in a state where the clutch is released and the differential torque between the torque balanced with the torque command value with respect to one of the first rotating machine and the clutch and the torque command value with respect to the other one of the first rotating machine and the clutch is within a predetermined range during the torque control. With the driving device for a hybrid vehicle according to the invention, an excessive increase in electric power consumption can be inhibited when the engine is started.

MODES FOR CARRYING OUT THE INVENTION

Hereinafter, a driving device for a hybrid vehicle according to embodiments of the invention will be described in detail with reference to accompanying drawings. The invention is not limited to the embodiments. Components that constitute the following embodiments include those that can be easily assumed by those skilled in the art and those substantially identical thereto.

First Embodiment

Figure 1:
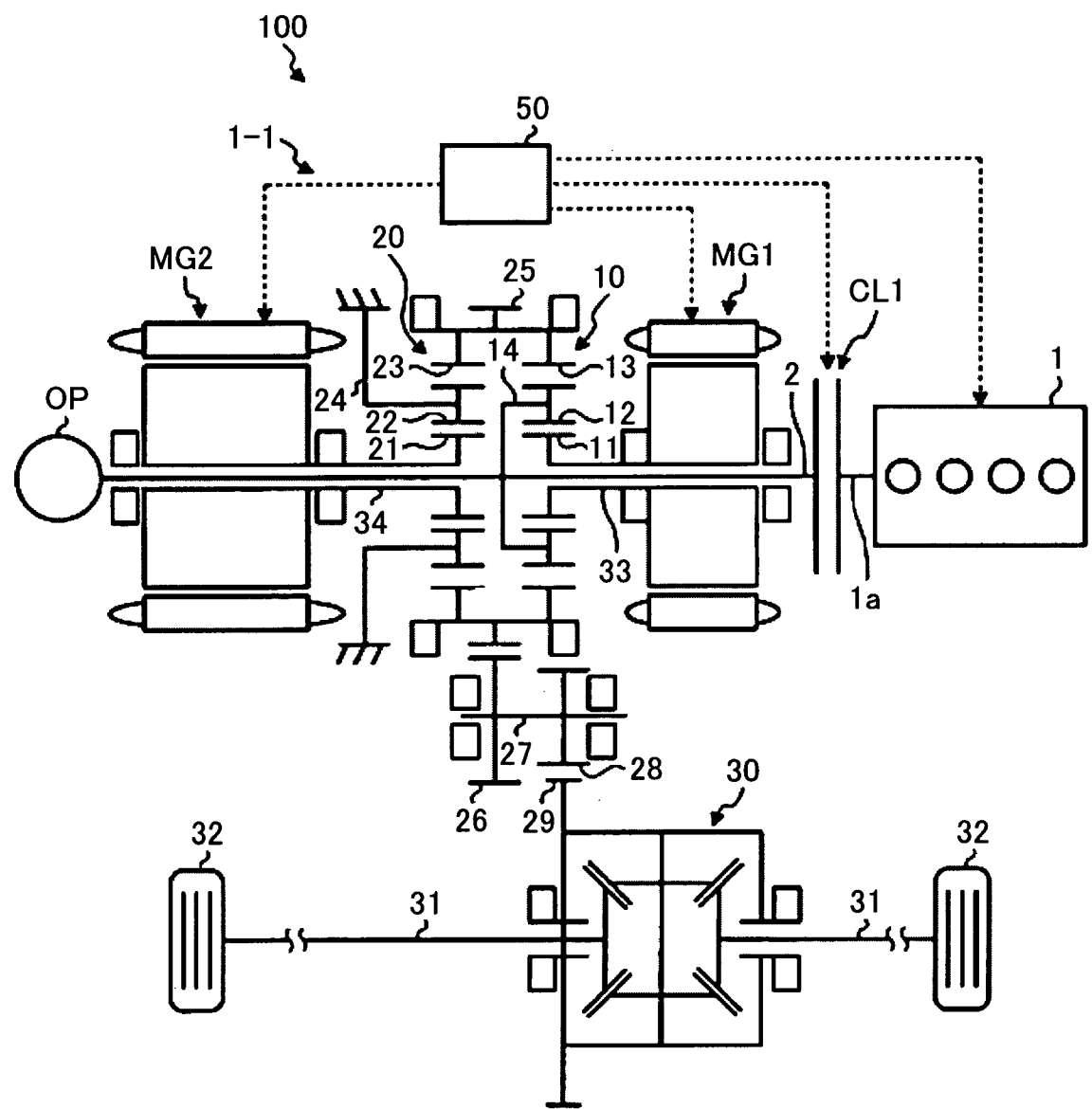
FIG. 1 is a skeleton diagram of a vehicle according to a first embodiment.
Figure 2:
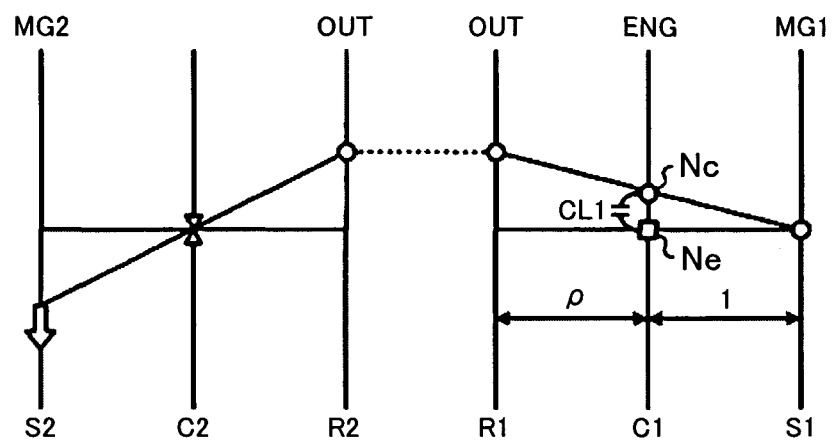
FIG. 2 is a nomogram regarding an EV traveling mode of the first embodiment.
Figure 3:
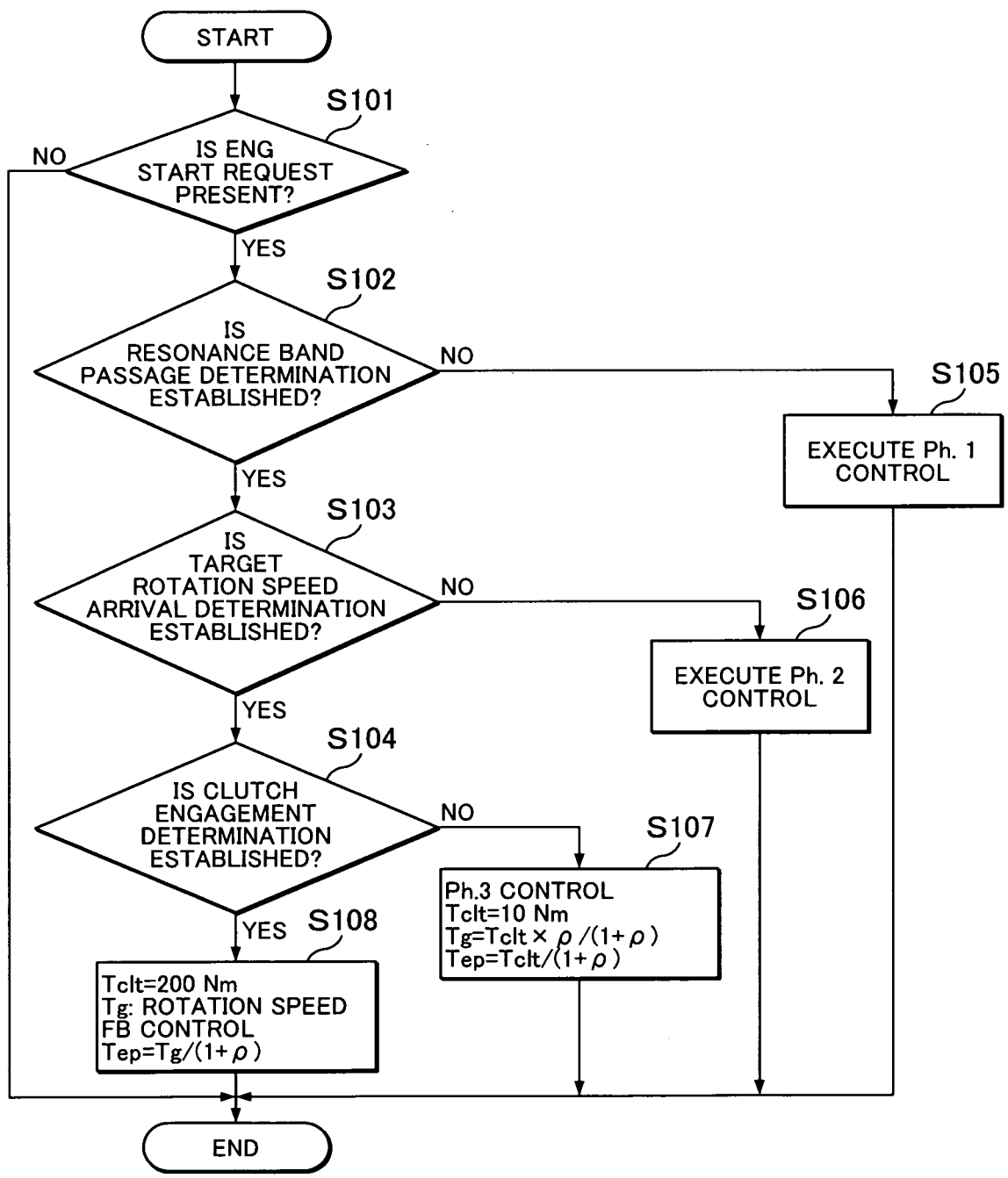
FIG. 3 is a flowchart regarding control according to the first embodiment.
Figure 4:
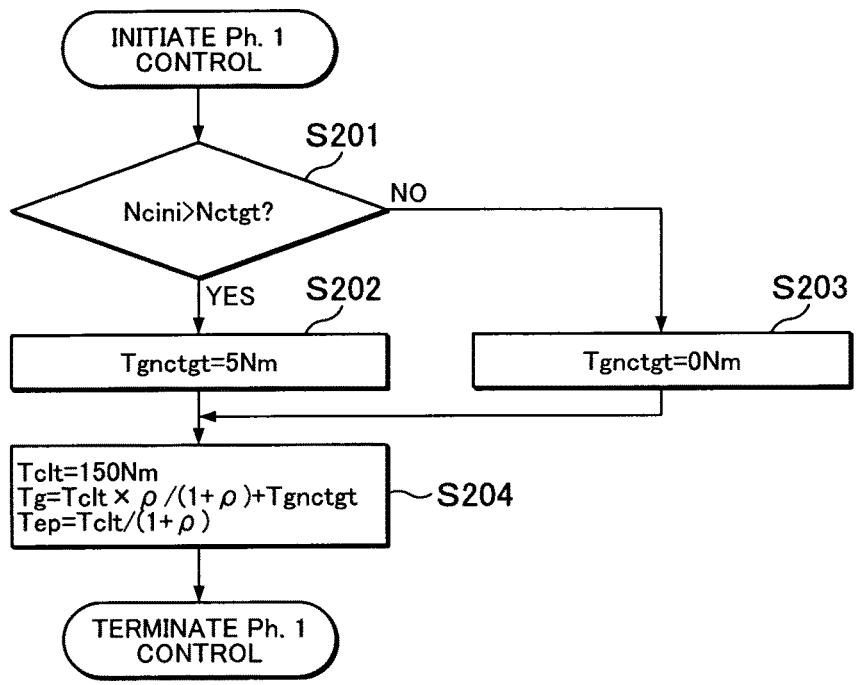
FIG. 4 is a flowchart regarding a first control according to the first embodiment.
Figure 5:
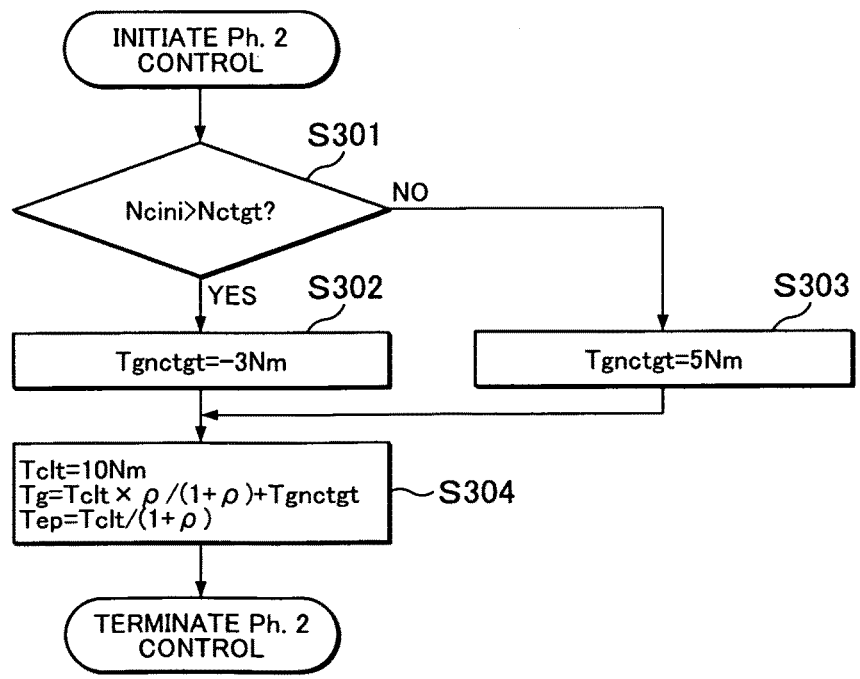
FIG. 5 is a flowchart regarding a second control according to the first embodiment.
Figure 6:
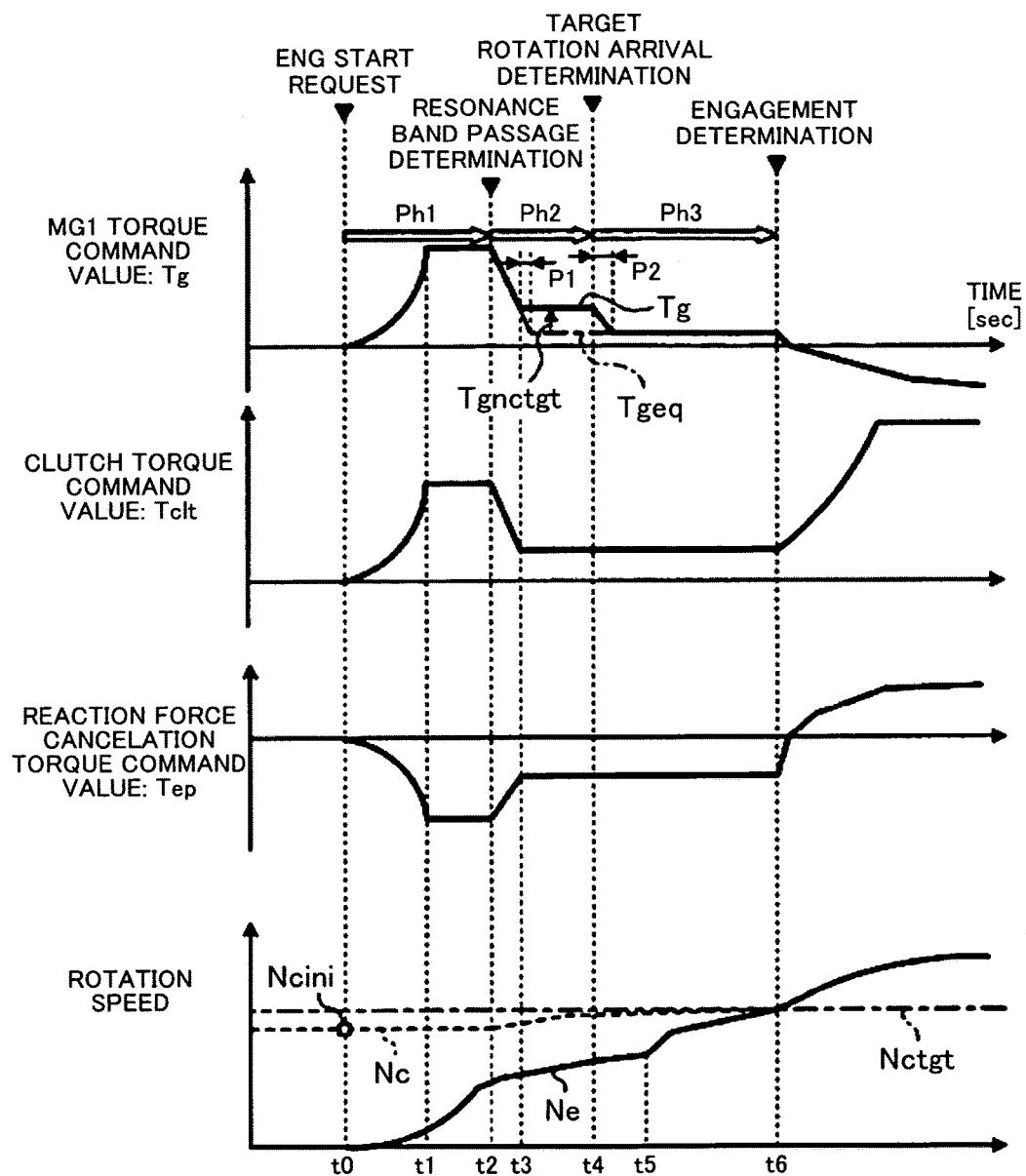
FIG. 6 is a time chart regarding the control according to the first embodiment.
Figure 7:
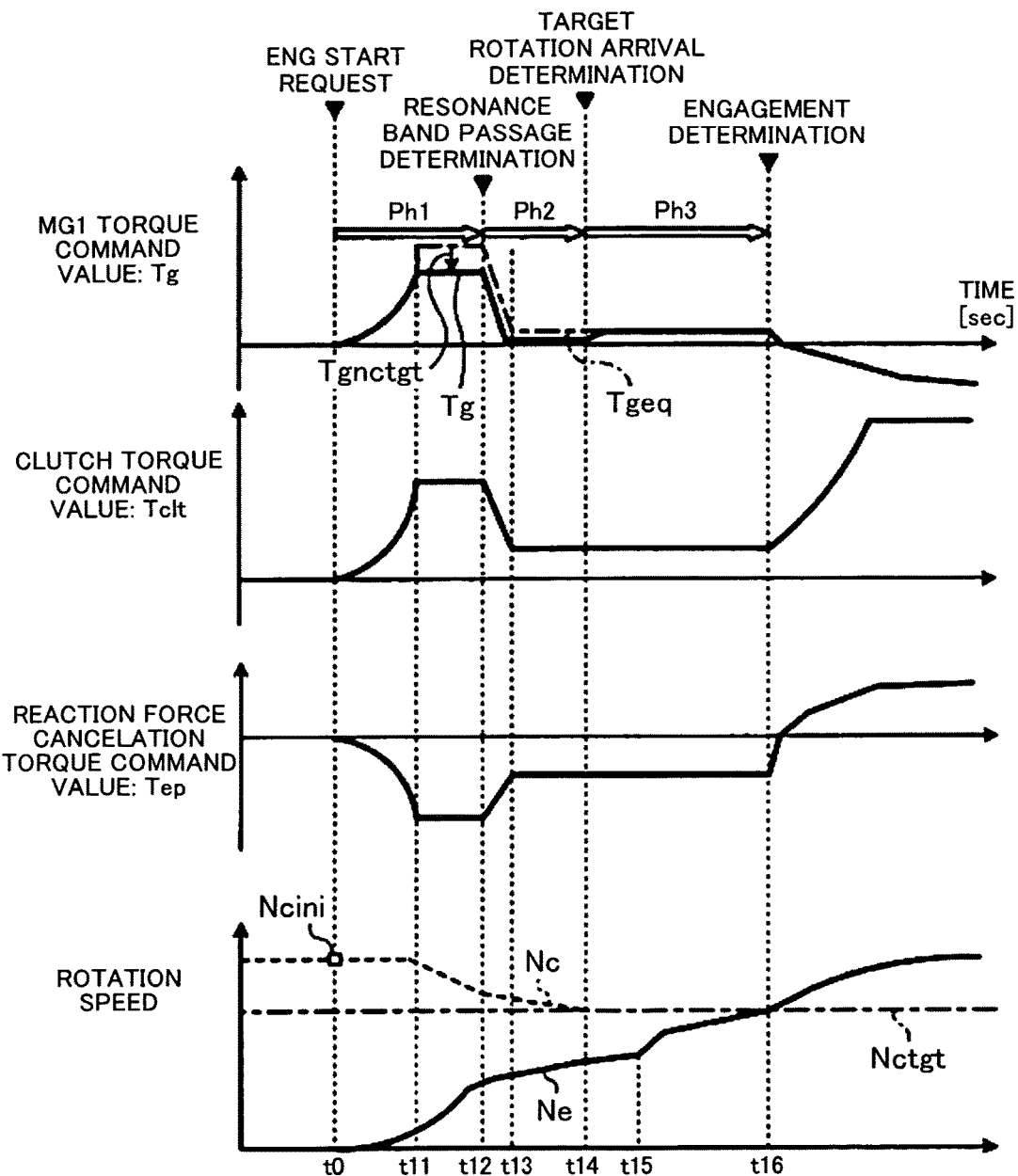
FIG. 7 is another time chart regarding the control according to the first embodiment.

A first embodiment will be described with reference to FIGS. 1 to 7. This embodiment relates to a driving device for a hybrid vehicle. FIG. 1 is a skeleton diagram of a vehicle according to the first embodiment of the invention. FIG. 2 is a nomogram regarding an EV traveling mode of the first embodiment. FIG. 3 is a flowchart regarding control according to the first embodiment. FIG. 4 is a flowchart regarding a first control according to the first embodiment. FIG. 5 is a flowchart regarding a second control according to the first embodiment. FIG. 6 is a time chart regarding the control according to the first embodiment. FIG. 7 is another time chart regarding the control according to the first embodiment.

As illustrated in FIG. 1, a vehicle 100 is a hybrid vehicle that has an engine 1, a first rotating machine MG1, and a second rotating machine MG2. The vehicle 100 may be a plug-in hybrid vehicle (PHV) that can be charged by an external electric power supply. A driving device 1-1 for a hybrid vehicle according to this embodiment is configured to include a first planetary gear mechanism 10, the first rotating machine MG1, the second rotating machine MG2, the engine 1, and a first clutch CL1. The driving device 1-1 for a hybrid vehicle may be configured to include an ECU 50 as well. The driving device 1-1 for a hybrid vehicle can be applied to a front-engine, front-wheel-drive (FF) vehicle, a rear-engine, rear-wheel-drive (RR) vehicle, and the like. The driving device 1-1 for a hybrid vehicle is mounted on the vehicle 100 for the axial direction of the driving device 1-1 for a hybrid vehicle to correspond to, for example, the width direction of the vehicle.

The engine 1, which is an example of engines, converts the combustion energy of a fuel into the rotary motion of an output shaft 1a and outputs the result. The output shaft 1a is connected to an input shaft 2 via the first clutch CL1. The first clutch CL1 is a friction engagement-type clutch device such as a wet multi-plate-type clutch. The first clutch CL1 is capable of torque capacity (clutch torque) control. The first clutch CL1 according to this embodiment can control the clutch torque by using a supplied hydraulic pressure.

The input shaft 2 is an input shaft of a power transmission unit and is arranged coaxially with the output shaft 1a and on an extension from the output shaft 1a. The input shaft 2 is connected to a first carrier 14 of the first planetary gear mechanism 10. The first carrier 14 according to this embodiment corresponds to a predetermined rotating element.

The first planetary gear mechanism 10, which is an example of differential mechanisms, is a single pinion-type planetary gear mechanism. The first planetary gear mechanism 10 has a first sun gear 11, a first pinion gear 12, a first ring gear 13, and the first carrier 14. The first ring gear 13 is arranged coaxially with the first sun gear 11 and radially outside the first sun gear 11. The first pinion gear 12 is arranged between the first sun gear 11 and the first ring gear 13 and meshes with each of the first sun gear 11 and the first ring gear 13. The first pinion gear 12 is rotatably supported by the first carrier 14. The first carrier 14 is connected to the input shaft 2 and rotates integrally with the input shaft 2. Accordingly, the first pinion gear 12 can rotate (revolve) about the central axis of the input shaft 2 with the input shaft 2 and can rotate (spin) about the central axis of the first pinion gear 12 by being supported by the first carrier 14.

The first sun gear 11 is connected to a rotating shaft 33 of the first rotating machine MG1 and rotates integrally with a rotor of the first rotating machine MG1. The first rotating machine MG1 is arranged on the engine 1 side with respect to the first planetary gear mechanism 10.

A second planetary gear mechanism 20 is arranged coaxially with the first planetary gear mechanism 10 and on the side opposite to the engine 1 side. The second planetary gear mechanism 20 is arranged to be adjacent to the first planetary gear mechanism 10 and constitutes a complex planetary with the first planetary gear mechanism 10. The second planetary gear mechanism 20 functions as a deceleration planetary that decelerates the rotation of the second rotating machine MG2 and outputs the result. The second planetary gear mechanism 20 is a single pinion-type planetary gear mechanism. The second planetary gear mechanism 20 has a second sun gear 21, a second pinion gear 22, a second ring gear 23, and a second carrier 24.

The second ring gear 23 is arranged coaxially with the second sun gear 21 and radially outside the second sun gear 21. The second pinion gear 22 is arranged between the second sun gear 21 and the second ring gear 23 and meshes with each of the second sun gear 21 and the second ring gear 23. The second pinion gear 22 is rotatably supported by the second carrier 24. The second carrier 24 is fixed, not to be rotatable, on a vehicle body side. The second pinion gear 22 is supported by the second carrier 24 and can rotate (spin) about the central axis of the second pinion gear 22.

The second sun gear 21 is connected to a rotating shaft 34 of the second rotating machine MG2 and rotates integrally with a rotor of the second rotating machine MG2. The second ring gear 23 is connected to the first ring gear 13 and rotates integrally with the first ring gear 13. A counter drive gear 25 is disposed on outer peripheral surfaces of the first ring gear 13 and the second ring gear 23. The counter drive gear 25 is an output gear that is disposed in output shafts of the first planetary gear mechanism 10 and the second planetary gear mechanism 20. The counter drive gear 25 meshes with a counter driven gear 26. The counter driven gear 26 is connected to a drive pinion gear 28 via a counter shaft 27. The drive pinion gear 28 meshes with a differential ring gear 29 of a differential device 30. The differential device 30 is connected to driving wheels 32 via right and left driving shafts 31.

Each of the first rotating machine MG1 and the second rotating machine MG2 functions as a motor (electric motor) and an electric power generator. The first rotating machine MG1 and the second rotating machine MG2 are connected to a battery via inverters. The first rotating machine MG1 and the second rotating machine MG2 can convert the electric power that is supplied from the battery into mechanical power and output the result and can convert mechanical power into electric power by being driven by input power. The electric power that is generated by the rotating machines MG1, MG2 can be stored in the battery. AC synchronous-type motor generators or the like can be used as the first rotating machine MG1 and the second rotating machine MG2.

An oil pump OP is arranged in the end portion of the input shaft 2 on the side opposite to the engine 1 side. The oil pump OP is driven by the rotation of the input shaft 2 so that a lubricant is supplied to each portion of the vehicle 100.

The ECU 50 is an electronic control unit that has a computer. The ECU 50 is electrically connected to the engine 1, the first rotating machine MG1, and the second rotating machine MG2. The ECU 50 can control each of the engine 1, the first rotating machine MG1, and the second rotating machine MG2. The ECU 50 can execute various types of control such as injection control, ignition control, and intake control regarding the engine 1. In addition, the ECU 50 can control the output torque of the first rotating machine MG1 (hereinafter, referred to as "MG1 torque"). In this embodiment, an input/output current with respect to the first rotating machine MG1 (including an electric power generation amount) is regulated in accordance with a torque command value with respect to the first rotating machine MG1 (hereinafter, referred to as an "MG1 torque command value Tg") so that the MG1 torque is controlled. In addition, the ECU 50 can control the output torque of the second rotating machine MG2 (hereinafter, referred to as "MG2 torque"). In this embodiment, an input/output current with respect to the second rotating machine MG2 (including an electric power generation amount) is regulated in accordance with a torque command value with respect to the second rotating machine MG2 (hereinafter, referred to as an "MG2 torque command value") so that the MG2 torque is controlled.

The ECU 50 can control the first clutch CL1. In this embodiment, the ECU 50 outputs a clutch torque command value (hereinafter, referred to as a "clutch torque command value Tclt") to a hydraulic control device that regulates the supplied hydraulic pressure (engagement hydraulic pressure) with respect to the first clutch CL1. The hydraulic control device supplies a hydraulic pressure in accordance with the clutch torque command value Tclt to the first clutch CL1 and performs feedback control regarding the supplied hydraulic pressure so that the actual clutch torque becomes the clutch torque command value Tclt.

The vehicle 100 can selectively execute the EV traveling mode or a HV traveling mode. The EV traveling mode is a traveling mode in which traveling is performed with the second rotating machine MG2 serving as a power source. In the nomogram that is illustrated in FIG. 2, the S1 axis represents the first sun gear 11 and the rotation speed of the first rotating machine MG1 (hereinafter, referred to as an "MG1 rotation speed"), the C1 axis represents the first carrier 14 and the rotation speed of the engine 1, and the R1 axis represents the rotation speed of the first ring gear 13. The quadrangular mark on the C1 axis represents an engine rotation speed Ne and the circular mark on the C1 axis represents the rotation speed of the first carrier 14 (hereinafter, simply referred to as a "carrier rotation speed Nc").

In FIG. 2, the S2 axis represents the rotation speed of the second rotating machine MG2 (hereinafter, referred to as an "MG2 rotation speed"), the C2 axis represents the rotation speed of the second carrier 24, and the R2 axis represents the rotation speed of the second ring gear 23. In this embodiment, the first ring gear 13 and the second ring gear 23 are connected to each other, and thus the rotation speeds of both correspond to each other.

As illustrated in FIG. 2, the first clutch CL1 is released during the EV traveling. During the EV traveling, the engine 1 is stationary and the carrier rotation speed Nc is the rotation speed in accordance with the speed of the vehicle. The second rotating machine MG2 can generate a forward driving force in the vehicle 100 based on the output of positive torque from the second ring gear 23 by outputting negative torque and causing negative rotation. Herein, positive rotation means the direction of rotation of each of the ring gears 13, 23 during the forward traveling of the vehicle 100. The rotation of the second carrier 24 is restricted, and thus the second carrier 24 functions to receive a reaction force with respect to the MG2 torque and transmits the MG2 torque to the second ring gear 23.

In this embodiment, the rotation of the first rotating machine MG1 is stopped during the EV traveling. The first rotating machine MG1 is maintained in a state where the rotation is stopped by, for example, cogging torque. During the EV traveling, the first rotating machine MG1 may rotate at a low rotation speed (such as 100 rpm or less). The dragging loss or the like of the first rotating machine MG1 is reduced because the first rotating machine MG1 remains stopped or remains in the low speed-rotation state.

The HV traveling mode is a traveling mode in which traveling is performed with the engine 1 serving as a power source. In the HV traveling mode, the second rotating machine MG2 may also serve as a power source. In the HV traveling mode, the first clutch CL1 is engaged. In the HV traveling mode, the first rotating machine MG1 functions to receive a reaction force with respect to engine torque. The first rotating machine MG1 functions to receive the reaction force with respect to the engine torque by outputting the MG1 torque and outputs the engine torque from the first ring gear 13. The first planetary gear mechanism 10 can function as a power dividing mechanism that distributes the engine torque to the first rotating machine MG1 side and an output side.

In a case where the engine 1 is started in a state where the first clutch CL1 is released, examples of which include the case of a transition from the EV traveling mode to the HV traveling mode, the first clutch CL1 is engaged and the cranking of the engine 1 is performed by the MG1 torque. As a result of the engagement of the first clutch CL1, torque is transmitted to the engine 1 from the first rotating machine MG1 or the like via the first clutch CL1 and the engine rotation speed Ne rises. The ECU 50 executes firing and allows the engine 1 to be subjected to a transition to an autonomous operation when the engine rotation speed Ne rises up to a predetermined injection-permitted rotation speed.

The execution of rotation speed feedback control regarding the first rotating machine MG1 can be taken into account during the increase in the engine rotation speed Ne based on the engagement of the first clutch CL1 and the output of the MG1 torque. In a case where the rotation speed feedback control is performed, the MG1 torque command value Tg fluctuates depending on the deviation between a target MG1 rotation speed and the actual MG1 rotation speed. Accordingly, the MG1 torque command value Tg increases due to, for example, a variation of the coefficient of friction of the first clutch CL1, and this causes the electric power that is used to exceed an upper limit in some cases. When the engagement force of the first clutch CL1 increases more than expected during the rotation speed feedback control, for example, the carrier rotation speed Nc (or the MG1 rotation speed) is reduced. Then, the MG1 torque command value Tg increases to inhibit the reduction, and the electric power that is consumed by the first rotating machine MG1 may exceed a tolerance.

The driving device 1-1 for a hybrid vehicle according to this embodiment executes torque control for the first rotating machine MG1 and the first clutch CL1 until at least the carrier rotation speed Nc reaches a target engagement rotation speed Nctgt (target rotation speed), as described below with reference to FIGS. 6, 7, and the like, in a case where the engine 1 is started in a state where the first clutch CL1 is released. During the torque control, the MG1 torque command value Tg with respect to the first rotating machine MG1 and the clutch torque command value Tclt with respect to the first clutch CL1 change for one of the torque command values to respond to the other one of the torque command values and the differential torque between the torque command value with respect to the other one and torque balanced with the torque command value with respect to one is within a predetermined range. The target engagement rotation speed Nctgt is the target rotation speed that the first carrier 14 has when the first clutch CL1 is fully engaged while the engine is started.

The torque control for the first rotating machine MG1 and the first clutch CL1 according to this embodiment is control for outputting a value determined in advance as a torque command value and differs from the rotation speed feedback control. The torque control according to this embodiment differs from a change in the torque command value depending on the carrier rotation speed Nc and the MG1 rotation speed. During the torque control according to this embodiment, the torque command value is output in, for example, a pattern determined in advance. Accordingly, the torque control according to this embodiment can forestall the electric power that is used exceeding the upper limit while the engine 1 is started as in the rotation speed feedback control. In other words, the driving device 1-1 according to this embodiment can inhibit an excessive increase in electric power consumption when the engine 1 is started.

Hereinafter, the control according to this embodiment will be described with reference to FIGS. 3 to 7. The time chart that is illustrated in FIG. 6 shows a control flow pertaining to a case where a carrier rotation speed at start request Ncini is less than the target engagement rotation speed Nctgt and the time chart that is illustrated in FIG. 7 shows a control flow pertaining to a case where the carrier rotation speed at start request Ncini exceeds the target engagement rotation speed Nctgt. The MG1 torque command value Tg, the clutch torque command value Tclt, a reaction force cancellation torque command value Tep, the carrier rotation speed Nc, and the engine rotation speed Ne are illustrated in each of the time charts. A reaction force cancellation torque is torque that inhibits the fluctuation of the output torque with respect to the driving shafts 31 by the engagement of the first clutch CL1. The ECU 50 cancels the reaction force that results from the engagement of the first clutch CL1 by allowing the second rotating machine MG2 to output the reaction force cancellation torque.

The control flow that is illustrated in FIG. 3 is executed during a system operation. The control flow that is illustrated in FIG. 3 is repeatedly executed at, for example, predetermined intervals.

Firstly, in Step S101, the ECU 50 determines the presence or absence of a start request for the engine 1. The start request for the engine 1 is made in a case where, for example, the following expression (1) is satisfied.

$$Preq > Pbmax - Pst \qquad (1)$$

Herein, Preq represents a power demand with respect to the vehicle 100, Pbmax represents the upper limit of the electric power that can be output by the battery, and Pst represents the electric power that is required when the engine 1 is started.

The processing proceeds to Step S102 in a case where the start request for the engine 1 is determined to be present as a result of the determination of Step S101 (Step S101—Y). Otherwise (Step S101—N), this control flow is terminated. In each of FIGS. 6 and 7, the start request for the engine 1 is determined to be present at time t0.

In Step S102, the ECU 50 determines whether or not a resonance band passage determination is established. The ECU 50 performs a positive determination in Step S102 in a case where, for example, the engine rotation speed Ne exceeds a predetermined rotation speed (such as 300 rpm). The predetermined rotation speed is determined based on, for example, the resonance frequency of a damper of the engine 1. The vibration that occurs when the engine is started can be inhibited when the engine rotation speed Ne is raised early to at least a rotation speed corresponding to the resonance frequency of the damper during the cranking. The processing proceeds to Step S103 in a case where the resonance band passage determination is determined to be established as a result of the determination of Step S102 (Step S102—Y). Otherwise (Step S102—N), the processing proceeds to Step S105. The resonance band passage determination is established at time t2 in FIG. 6 and at time t12 in FIG. 7.

In Step S103, the ECU 50 determines whether or not a target rotation speed arrival determination is established. The ECU 50 performs the determination of Step S103 based on whether or not the carrier rotation speed Nc is synchronized with the target engagement rotation speed Nctgt. The ECU 50 performs a positive determination in Step S103 in a case where, for example, the absolute value of the deviation between the carrier rotation speed Nc and the target engagement rotation speed Nctgt is equal to or less than a predetermined value (such as 50 rpm). The processing proceeds to Step S104 in a case where the target rotation speed arrival determination is determined to be established as a result of the determination of Step S103 (Step S103—Y). Otherwise (Step S103—N), the processing proceeds to Step S106. The target rotation speed arrival determination is established at time t4 in FIG. 6 and at time t14 in FIG. 7.

In Step S104, the ECU 50 determines whether or not a clutch engagement determination is established. The ECU 50 performs a positive determination in Step S104 in a case where, for example, the absolute value of the deviation between the carrier rotation speed Nc and the engine rotation speed Ne is equal to or less than a predetermined value (such as 50 rpm). The processing proceeds to Step S108 in a case where the clutch engagement determination is determined to be established as a result of the determination of Step S104 (Step S104—Y). Otherwise (Step S104—N), the processing proceeds to Step S107. The clutch engagement determination is established at time t6 in FIG. 6 and at time t16 in FIG. 7.

In Step S105, the ECU 50 executes the first control (Ph. 1 control). The first control will be described with reference to FIG. 4. The first control is the torque control for the first rotating machine MG1 and the first clutch CL1 that is executed until the engine rotation speed Ne passes through a resonance band after the engine start request is made.

Firstly, in Step S201, the ECU 50 determines whether or not the carrier rotation speed at start request Ncini exceeds the target engagement rotation speed Nctgt. The carrier rotation speed at start request Ncini is the carrier rotation speed Nc at the initiation of the torque control for the first rotating machine MG1 and the first clutch CL1. The carrier rotation speed at start request Ncini according to this embodiment is the rotation speed of the first carrier 14 that is acquired when the start request for the engine 1 is made and is, for example, the rotation speed of the first carrier 14 that is acquired when a positive determination is made in Step S101. The processing proceeds to Step S202 in a case where the carrier rotation speed at start request Ncini is determined to exceed the target engagement rotation speed Nctgt as a result of the determination of Step S201 (Step S201—Y). Otherwise (Step S201—N), the processing proceeds to Step S203. In FIG. 6, the carrier rotation speed at start request Ncini is less than the target engagement rotation speed Nctgt. Accordingly, a negative determination is made in Step S201. In FIG. 7, the carrier rotation speed at start request Ncini exceeds the target engagement rotation speed Nctgt. Accordingly, a positive determination is made in Step S201.

In Step S202, an additional torque Tgnctgt is substituted with a predetermined value by the ECU 50. In this embodiment, the MG1 torque command value Tg is calculated by the addition of the additional torque Tgnctgt to torque Tgeq balanced with the clutch torque command value Tclt (refer to FIGS. 6 and 7) as described later. In this embodiment, the value of the additional torque Tgnctgt that is set in Step S202 is a negative value such as −5 [Nm]. The value of the additional torque Tgnctgt that is set in Step S202 is a positive or negative value on the side that approximates the carrier rotation speed Nc to the target engagement rotation speed Nctgt. The processing proceeds to Step S204 after the execution of Step S202.

In Step S203, the additional torque Tgnctgt is substituted with a predetermined value by the ECU 50. In this embodiment, the value of the additional torque Tgnctgt that is set in Step S203 is 0. In other words, the MG1 torque command value Tg is balanced with the clutch torque command value Tclt. As described above, the additional torque Tgnctgt on the side reducing the MG1 torque command value Tg is permitted but the additional torque Tgnctgt on the side increasing the MG1 torque command value Tg is not permitted during the first control. Accordingly, an increase in the electric power that is consumed by the first rotating machine MG1 can be inhibited and an increase in an electric power peak during the start of the engine can be inhibited. The processing proceeds to Step S204 after the execution of Step S203.

In Step S204, the clutch torque command value Tclt, the MG1 torque command value Tg, and the reaction force cancellation torque command value Tep are determined by the ECU 50. The clutch torque command value Tclt is, for example, a command value during the passage through the resonance band determined in advance. The command value during the passage through the resonance band according to this embodiment is determined based on the maximum permissible value of the MG1 torque command value Tg. The maximum value of the MG1 torque command value Tg is based on, for example, the maximum electric power that can be supplied from the battery to the first rotating machine MG1 for the start of the engine. In this embodiment, the clutch torque command value Tclt during the passage through the resonance band is 150 [Nm]. As illustrated in FIGS. 6 and 7, the clutch torque command value Tclt in a transient state gradually increases toward the command value during the passage through the resonance band. The clutch torque command value Tclt increases up to a desired clutch torque during the passage through the resonance band (150 [Nm] herein) at time t1 in FIG. 6 and at time t11 in FIG. 7. Then, the clutch torque command value Tclt is maintained constant.

The MG1 torque command value Tg is calculated by the following equation (2) and based on the clutch torque command value Tclt and the additional torque Tgnctgt.

$$Tg = Tclt \times \rho/(1+\rho) + Tgnctgt \qquad (2)$$

Herein, ρ represents the gear ratio of the first planetary gear mechanism 10.

In the case of FIG. 7, a positive determination is made in Step S201 and the processing proceeds to Step S202. Accordingly, the additional torque Tgnctgt is a negative value. Accordingly, the MG1 torque command value Tg that is calculated by the above equation (2) is torque smaller than torque balanced with the clutch torque (hereinafter, simply referred to as "balanced torque Tgeq"). The balanced torque Tgeq, which is illustrated by the one-dot chain line in FIG. 7, is the torque of the first term on the right-hand side of the above equation (2). The engagement of the first clutch CL1 allows the first rotating machine MG1 and the engine 1 to transmit torque via the first planetary gear mechanism 10 in accordance with the clutch torque. The balanced torque Tgeq is the value that is obtained by converting the clutch torque command value Tclt to torque on the first sun gear 11 based on the gear ratio ρ. In the case of FIG. 7, the MG1 torque command value Tg is the value that is obtained by adding the negative additional torque Tgnctgt to the balanced torque Tgeq. Accordingly, the carrier rotation speed Nc begins to decrease toward the target engagement rotation speed Nctgt at time t11.

In the case of FIG. 6, a negative determination is made in Step S201 and the processing proceeds to Step S203. Accordingly, the additional torque Tgnctgt is 0. Accordingly, the MG1 torque command value Tg that is calculated by the above equation (2) corresponds to the balanced torque Tgeq. The ECU 50 increases the MG1 torque command value Tg up to the value that is determined in the above equation (2) once the engine start request is made. The MG1 torque command value Tg increases in accordance with the clutch torque command value Tclt.

In addition, the ECU 50 calculates the reaction force cancellation torque command value Tep by the following equation (3).

$$Tep = Tclt/(1+\rho) \quad (3)$$

The ECU 50 outputs the determined clutch torque command value Tclt to the first clutch CL1 and outputs the determined MG1 torque command value Tg to the first rotating machine MG1. In addition, the ECU 50 outputs the value that is obtained by adding an increment in accordance with the reaction force cancellation torque command value Tep to the MG2 torque determined from a driving force demand with respect to the vehicle 100 as the torque command value with respect to the second rotating machine MG2. The control flow of the first control that is illustrated in FIG. 4 is terminated once Step S204 is executed. The ECU 50 terminates the control flow that is illustrated in FIG. 3 once the control flow of the first control is terminated.

In Step S106, the ECU 50 executes the second control (Ph. 2 control). The second control will be described with reference to FIG. 5. The second control is the torque control for the first rotating machine MG1 and the first clutch CL1 that is executed until the carrier rotation speed Nc reaches the target engagement rotation speed Nctgt after the engine rotation speed Ne passes through the resonance band.

Firstly, in Step S301, the ECU 50 determines whether or not the carrier rotation speed at start request Ncini exceeds the target engagement rotation speed Nctgt. The processing proceeds to Step S302 in a case where the carrier rotation speed at start request Ncini is determined to exceed the target engagement rotation speed Nctgt as a result of the determination of Step S301 (Step S301—Y). Otherwise (Step S301—N), the processing proceeds to Step S303.

In Step S302, the additional torque Tgnctgt is substituted with a predetermined value by the ECU 50. In this embodiment, the value of the additional torque Tgnctgt that is set in Step S302 is a negative value such as −3 [Nm]. The value of the additional torque Tgnctgt that is set in Step S302 is a positive or negative value on the side that approximates the carrier rotation speed Nc to the target engagement rotation speed Nctgt. In the case of FIG. 7, a positive determination is made in Step S301, the processing proceeds to Step S302, and the additional torque Tgnctgt is set to a negative value. The processing proceeds to Step S304 after the execution of Step S302.

In Step S303, the additional torque Tgnctgt is substituted with a predetermined value by the ECU 50. In this embodiment, the value of the additional torque that is set in Step S303 is a positive value such as 5 [Nm]. The value of the additional torque Tgnctgt that is set in Step S303 is a positive or negative value on the side that approximates the carrier rotation speed Nc to the target engagement rotation speed Nctgt. As described above, both the additional torque Tgnctgt on the side reducing the MG1 torque command value Tg and the additional torque Tgnctgt on the side increasing the MG1 torque command value Tg are permitted during the second control. In the case of FIG. 6, a negative determination is made in Step S301, the processing proceeds to Step S303, and the additional torque Tgnctgt is set to a positive value. The processing proceeds to Step S304 after the execution of Step S303.

In Step S304, the clutch torque command value Tclt, the MG1 torque command value Tg, and the reaction force cancellation torque command value Tep are determined by the ECU 50. The clutch torque command value Tclt of the second control is smaller in magnitude than the clutch torque command value Tclt of the first control. This is because the engine rotation speed Ne has already passed through the resonance band. In this embodiment, the clutch torque command value Tclt of the second control is, for example, 10 [Nm]. The MG1 torque command value Tg is calculated by the above equation (2) and based on the clutch torque command value Tclt and the additional torque Tgnctgt.

The ECU 50 outputs the determined clutch torque command value Tclt to the first clutch CL1 and outputs the MG1 torque command value Tg to the first rotating machine MG1. As illustrated in FIGS. 6 and 7, the clutch torque command value Tclt gradually decreases toward a desired value (10 [Nm] herein). The clutch torque command value Tclt reaches the desired value at time t3 in FIG. 6 and at time t13 in FIG. 7. In addition, the MG1 torque command value Tg decreases in response to the decrease in the clutch torque command value Tclt. As illustrated in FIG. 6, the MG1 torque command value Tg of the second control is the torque that exceeds the balanced torque Tgeq by a margin of the additional torque Tgnctgt. Accordingly, the carrier rotation speed Nc rises toward the target engagement rotation speed Nctgt from time t3.

In addition, the ECU 50 outputs the value that is obtained by adding a correction value corresponding to the reaction force cancellation torque command value Tep to the MG2 torque determined from the driving force demand with respect to the vehicle 100 as the torque command value with respect to the second rotating machine MG2. The reaction force cancellation torque command value Tep is calculated by, for example, the above equation (3). The control flow of the second control that is illustrated in FIG. 5 is terminated once Step S304 is executed. The ECU 50 terminates the control flow that is illustrated in FIG. 3 once the control flow of the second control is terminated.

In Step S107 illustrated in FIG. 3, a third control (Ph. 3 control) is executed by the ECU 50. The third control is the torque control for the first rotating machine MG1 and the first clutch CL1 that is executed until the first clutch CL1 is fully engaged after the carrier rotation speed Nc reaches the target engagement rotation speed Nctgt.

The clutch torque command value Tclt of the third control is, for example, equal to the clutch torque command value Tclt of the second control. In the third control, the MG1 torque command value Tg corresponds to the torque Tgeq balanced with the clutch torque command value Tclt. The ECU 50 executes the firing and completes the start of the engine when the engine rotation speed Ne rises up to a predetermined injection-permitted rotation speed during the execution of the third control. The engine rotation speed Ne significantly rises with an initial explosion at time t5 in FIG. 6 and at time t15 in FIG. 7. The reaction force cancellation torque command value Tep of the third control is determined based on the clutch torque command value Tclt. This control flow is terminated after the execution of Step S107. The third control is terminated and the processing proceeds to Step S108 once the engine rotation speed Ne rises up to the target engagement rotation speed Nctgt and the clutch engagement determination is established (Step S104—Y).

In Step S108, the ECU 50 executes control following the completion of the determination of the engagement of the first clutch CL1. The ECU 50 raises the clutch torque command value Tclt in one sweep. The ECU 50 increases the clutch torque command value Tclt and switches the MG1 torque command value Tg to a rotation speed feedback (FB) control command value. In addition, the ECU 50 changes the reaction force cancellation torque command value Tep from a value based on the clutch torque command value Tclt valid up to that moment in time to a value based on the MG1 torque command value Tg.

The clutch torque command value Tclt is a value that is less than the clutch torque command value Tclt of the first control. In this embodiment, the clutch torque command value Tclt pertaining to Step S108 is, for example, 200 [Nm]. The MG1 torque command value Tg is determined by rotation speed FB control. The ECU 50 performs feedback control based on, for example, PID control so as to reduce the deviation between the target MG1 rotation speed and the actual MG1 rotation speed and determines the MG1 torque command value Tg. In addition, the reaction force cancellation torque command value Tep is calculated by the following equation (4) and based on the MG1 torque command value Tg.

$$Tep=Tg/(1+\rho) \quad (4)$$

The ECU 50 outputs the determined clutch torque command value Tclt to the first clutch CL1 and outputs the determined MG1 torque command value Tg to the first rotating machine MG1. In addition, the ECU 50 outputs the value that is corrected by the reaction force cancellation torque command value Tep to the MG2 torque determined from the driving force demand with respect to the vehicle 100 as the torque command value with respect to the second rotating machine MG2. The control flow that is illustrated in FIG. 3 is terminated once Step S108 is executed.

As described above, the driving device 1-1 for a hybrid vehicle according to this embodiment executes the torque control for the first rotating machine MG1 and the first clutch CL1 when the engine 1 is started in a state where the first clutch CL1 is released. Accordingly, it is possible to inhibit the MG1 torque command value Tg from being affected by, for example, the variation of the coefficient of friction of the first clutch CL1. In addition, the MG1 torque command value Tg with respect to the first rotating machine MG1 and the clutch torque command value Tclt with respect to the first clutch CL1 change for one of the torque command values to respond to the other one of the torque command values during the torque control (first control and second control). In other words, the other one of the torque command values increases in a case where one of the torque command values increases and the other one of the torque command values decreases in a case where one of the torque command values decreases. In addition, the other one of the torque command values is constant in a case where one of the torque command values is constant. Accordingly, the cranking torque that is transmitted to the engine 1 can be appropriately controlled to a desired torque.

In addition, the differential torque between the torque balanced with the torque command value with respect to one and the torque command value with respect to the other one is within a predetermined range. In this embodiment, the differential torque between the MG1 torque command value Tg and the balanced torque Tgeq is within the range of the additional torque Tgnctgt determined in advance. In this embodiment, the difference between the MG1 torque command value Tg and the balanced torque Tgeq is constant except during a transition period when the difference between the MG1 torque command value Tg and the balanced torque Tgeq is increased or the difference between the MG1 torque command value Tg and the balanced torque Tgeq is decreased (such as the period P1 and the period P2 in FIG. 6). Accordingly, the carrier rotation speed Nc can be confined toward the target engagement rotation speed Nctgt while the MG1 torque and the clutch torque are balanced with each other.

In addition, in the driving device 1-1 for a hybrid vehicle according to this embodiment, the differential torque between the balanced torque Tgeq and the MG1 torque command value Tg during the torque control for the first rotating machine MG1 and the first clutch CL1 is based on the magnitude relation between the target engagement rotation speed Nctgt and the carrier rotation speed at start request Ncini.

The differential torque described above is a value on the side approximating the carrier rotation speed Nc to the target engagement rotation speed Nctgt. For example, the ECU 50 has the additional torque Tgnctgt that is a negative value in a case where the carrier rotation speed at start request Ncini exceeds the target engagement rotation speed Nctgt. Then, the MG1 torque command value Tg becomes a value on the side reducing the carrier rotation speed Nc with respect to the balanced torque Tgeq and the carrier rotation speed Nc can be changed toward the target engagement rotation speed Nctgt.

In addition, the ECU 50 has the additional torque Tgnctgt that is a positive value in a case where the carrier rotation speed at start request Ncini is less than the target engagement rotation speed Nctgt. Then, the MG1 torque command value Tg becomes a value on the side raising the carrier rotation speed Nc with respect to the balanced torque Tgeq and the carrier rotation speed Nc can be changed toward the target engagement rotation speed Nctgt.

In addition, the magnitudes of the torque command values Tg, Tclt until the engine rotation speed Ne passes through the resonance band (first control) exceed the magnitudes of the torque command values Tg, Tclt after the engine rotation speed Ne passes through the resonance band (second control) in the torque control for the first rotating machine MG1 and the first clutch CL1, respectively. Accordingly, the engine rotation speed Ne can be quickly raised to a rotation speed exceeding the resonance band in the first control.

Since the MG1 torque command value Tg is a high value in the first control, an additional increase in the MG1 torque command value Tg by the additional torque Tgnctgt, which leads to an increase in electric power consumption, is not preferable. In addition, a demand for a large MG1 torque is not preferable because the demand leads to an increase in the size of the first rotating machine MG1. In this embodiment, the ECU 50 does not permit the additional torque Tgnctgt increasing the MG1 torque command value Tg and sets the differential torque after the engine rotation speed Ne passes through the resonance band in the first control in a case where the carrier rotation speed at start request Ncini is less than the target engagement rotation speed Nctgt. In other words, the positive additional torque Tgnctgt is permitted and the differential torque is set between the balanced torque Tgeq and the MG1 torque command value Tg after the engine rotation speed Ne passes through the resonance band in a case where the carrier rotation speed at start request Ncini is less than the target engagement rotation speed Nctgt. Accordingly, the driving device 1-1 for a hybrid vehicle according to this embodiment can forestall an increase in the electric power peak during the start of the engine.

In a case where the carrier rotation speed at start request Ncini exceeds the target engagement rotation speed Nctgt, the ECU 50 sets the differential torque before the engine rotation speed Ne passes through the resonance band. In a case where the carrier rotation speed at start request Ncini exceeds the target engagement rotation speed Nctgt, the additional torque Tgnctgt is a negative value and the MG1 torque command value Tg is torque less than the balanced torque Tgeq. In this case, the ECU 50 permits the additional torque Tgnctgt before the engine rotation speed Ne passes through the resonance band, that is, before the engine rotation speed Ne exceeds the resonance band, and sets the differential torque between the balanced torque Tgeq and the MG1 torque command value Tg. Accordingly, the carrier rotation speed Nc can begin to change toward the target engagement rotation speed Nctgt at an early timing.

In addition, the ECU 50 determines the reaction force cancellation torque command value Tep based on the clutch torque command value Tclt when the first clutch CL1 has yet to be fully engaged. Accordingly, an appropriate reaction force cancellation torque command value Tep can be more accurately estimated and determined in the case of a change in the MG1 rotation speed and in the case of a delay in clutch torque response to the MG1 torque than in a case where the reaction force cancellation torque command value Tep is determined based on the MG1 torque command value Tg.

After the first clutch CL1 is fully engaged, the ECU 50 determines the reaction force cancellation torque command value Tep based on the MG1 torque command value Tg. Accordingly, the reaction force cancellation torque command value Tep can be appropriately determined in accordance with a change in the MG1 torque after the first clutch CL1 is fully engaged. Accordingly, the driving device 1-1 for a hybrid vehicle according to this embodiment inhibits the fluctuation of the torque that is output to the driving shaft 31.

In addition, the ECU 50 sets the differential torque between the balanced torque Tgeq and the MG1 torque command value Tg by increasing or decreasing the MG1 torque command value Tg with respect to the balanced torque Tgeq. In addition, the ECU 50 removes the differential torque and allows the MG1 torque command value Tg to correspond to the balanced torque Tgeq when the carrier rotation speed Nc reaches the target engagement rotation speed Nctgt. The responsiveness of the torque control can be enhanced based on the increase or decrease in the MG1 torque more responsive to the clutch torque. For example, the advantage regarding the responsiveness is available in a case where the additional torque Tgnctgt is changed during the execution of the torque control for the first rotating machine MG1 and the first clutch CL1.

Second Embodiment

Figure 8:
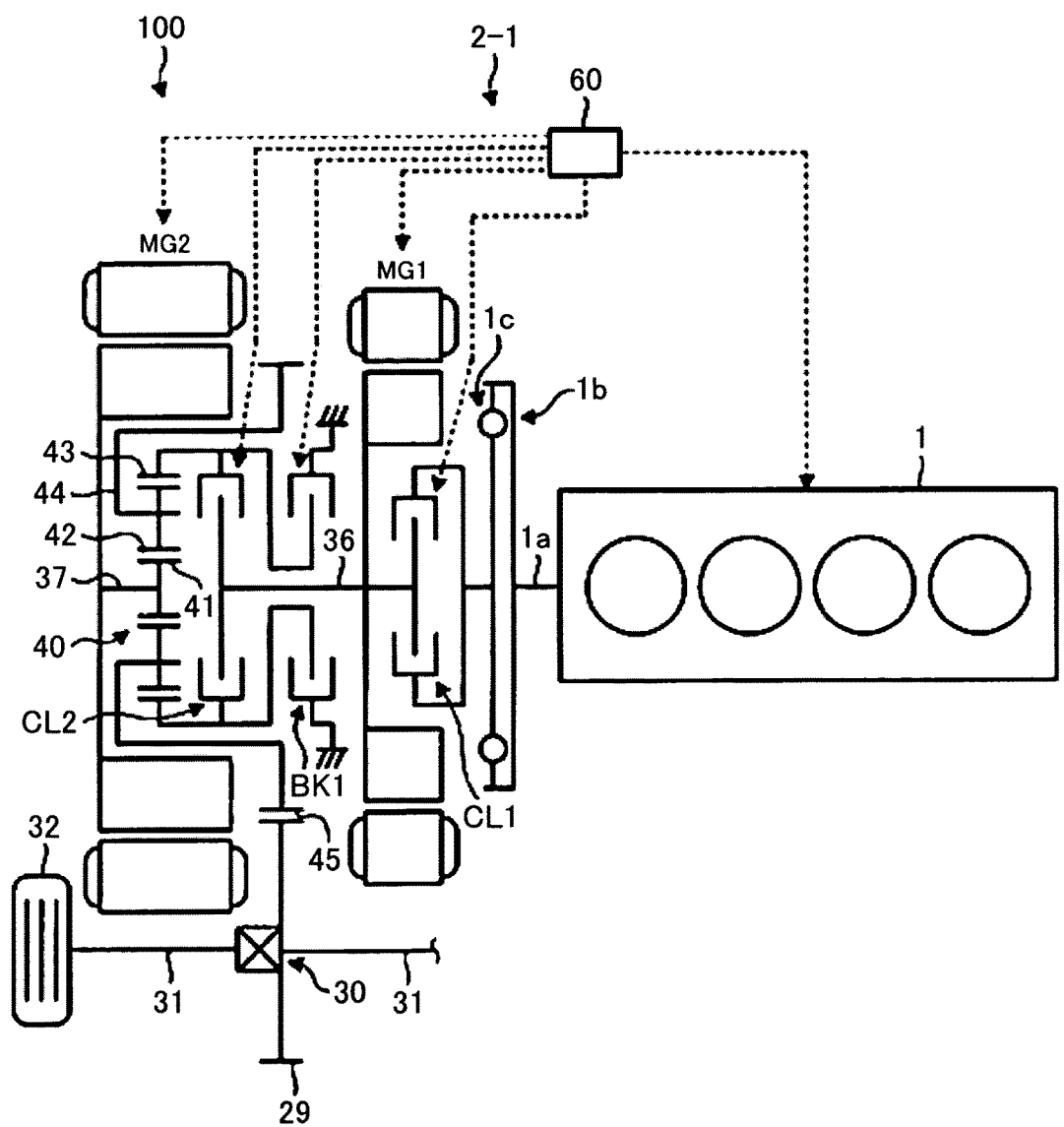
FIG. 8 is a skeleton diagram of a vehicle according to a second embodiment.
Figures 9, 10:
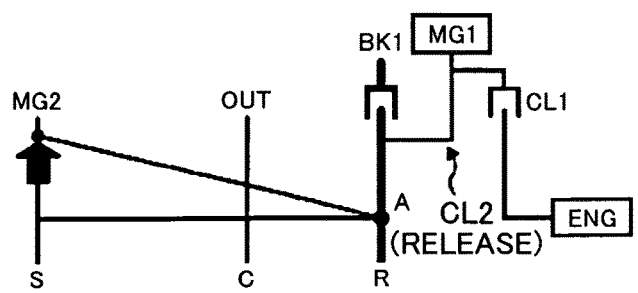
FIG. 9 is a diagram illustrating an operation engagement table according to the second embodiment.
FIG. 10 is a nomogram regarding a first traveling mode of the second embodiment.
Figure 11:
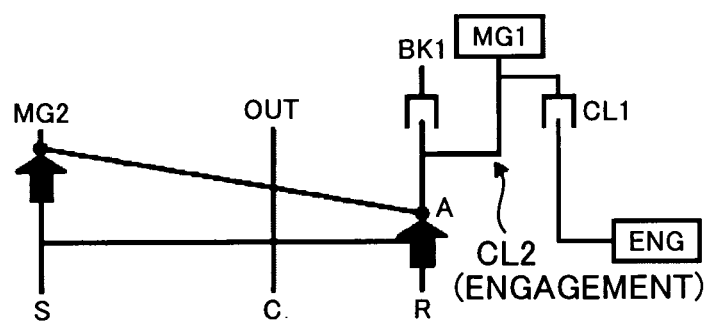
FIG. 11 is a nomogram regarding a second traveling mode of the second embodiment.

A second embodiment will be described with reference to FIGS. 8 to 10. In the following description of the second embodiment, the same reference numerals will be used to refer to the constituting elements that have the same functions as in the first embodiment and repetitive description thereof will be omitted. FIG. 8 is a skeleton diagram of a vehicle according to the second embodiment. FIG. 9 is a diagram illustrating an operation engagement table according to the second embodiment. FIG. 10 is a nomogram regarding a first traveling mode of the second embodiment. FIG. 11 is a nomogram regarding a second traveling mode of the second embodiment.

The vehicle 100 that is illustrated in FIG. 8 is a hybrid vehicle (HV) that has the engine 1, the first rotating machine MG1, and the second rotating machine MG2 as power sources. The vehicle 100 may be a plug-in hybrid vehicle (PHV) that can be charged by an external electric power supply. The vehicle 100 is configured to include a planetary gear mechanism 40, the first clutch CL1, a second clutch CL2, and a brake BK1 in addition to the power sources.

A driving device 2-1 for a hybrid vehicle according to this embodiment is configured to include the first rotating machine MG1, the second rotating machine MG2, the engine 1, the planetary gear mechanism 40, and the first clutch CL1. The driving device 2-1 for a vehicle may be configured to include an ECU 60 as well.

A rotating shaft 36 of the first rotating machine MG1 is connected to the output shaft 1a of the engine 1 via the first clutch CL1, a damper 1c, and a flywheel 1b. The planetary gear mechanism 40 is a single pinion-type planetary gear mechanism. The planetary gear mechanism 40 has a sun gear 41, a pinion gear 42, a ring gear 43, and a carrier 44.

A rotating shaft 37 of the second rotating machine MG2 is connected to the sun gear 41. An output gear 45 is connected to the carrier 44. The output gear 45 meshes with the differential ring gear 29 of the differential device 30. The differential device 30 is connected to the driving wheels 32 via the right and left driving shafts 31. The first rotating machine MG1 is connected to the ring gear 43 via the second clutch CL2. The first clutch CL1 and the second clutch CL2 can be, for example, friction engagement-type clutches. The ring gear 43 is a predetermined rotating element that is connected to the engine 1 via the first clutch CL1 and the second clutch CL2.

The brake BK1 restricts the rotation of the ring gear 43 when engaged. The brake BK1 according to this embodiment is, for example, a friction engagement-type brake device. When engaged, the brake BK1 connects the ring gear 43 and the vehicle body side to each other and restricts the rotation of the ring gear 43.

The ECU 60 controls the engine 1, the first rotating machine MG1, the second rotating machine MG2, the first clutch CL1, the second clutch CL2, and the brake BK1. The driving device 2-1 for a hybrid vehicle has the HV traveling mode and the EV traveling mode.

In the HV traveling mode, the first clutch CL1 and the second clutch CL2 are engaged and the brake BK1 is released. Accordingly, the engine 1, the first rotating machine MG1, and the ring gear 43 are connected.

The EV traveling mode includes the first traveling mode and the second traveling mode. The first traveling mode is a traveling mode in which traveling is performed with the second rotating machine MG2 serving as a power source. As illustrated in FIG. 9, the first clutch CL1 and the second clutch CL2 are released and the brake BK1 is engaged in the first traveling mode. In the nomogram that is illustrated in FIG. 10, the S axis represents the sun gear 41 and the rotation speed of the second rotating machine MG2, the C axis represents the rotation speed of the carrier 44, and the R axis represents the rotation speed of the ring gear 43. The engine 1 and the first rotating machine MG1 are separated from the ring gear 43 since the first clutch CL1 and the second clutch CL2 are released. The rotation of the ring gear 43 is restricted since the brake BK1 is engaged. Accordingly, the ring gear 43 functions to receive the reaction force with respect to the MG2 torque and can output the MG2 torque from the carrier 44.

As illustrated in FIG. 9, the second clutch CL2 is engaged and the first clutch CL1 and the brake BK1 are released in the second traveling mode. As illustrated in FIG. 11, the engine 1 is separated from the first rotating machine MG1 since the first clutch CL1 is released. In addition, the first rotating machine MG1 is connected to the ring gear 43 since the second clutch CL2 is engaged. In addition, the rotation of the ring gear 43 is allowed since the brake BK1 is released. Accordingly, each of the torque of the first rotating machine MG1 and the torque the second rotating machine MG2 is output from the carrier 44.

In a case where the engine 1 is started in a state where the first clutch CL1 is released, the ECU 60 executes the torque control for the first rotating machine MG1 and the first clutch CL1 until the rotation speed of the ring gear 43 reaches a target rotation speed. For example, the rotation speed of the ring gear 43 at the initiation of the torque control is 0 in a case where the engine 1 is started in the first traveling mode illustrated in FIG. 10. The ECU 60 executes the torque control for the first rotating machine MG1 and the first clutch CL1 by releasing the brake BK1 and engaging the second clutch CL2. The ECU 60 executes the torque control for the first rotating machine MG1 and the first clutch CL1 until, for example, at least the rotation speed of the ring gear 43 rises up to the target rotation speed.

It is preferable that the ECU 60 changes the MG1 torque command value Tg and the clutch torque command value Tclt in accordance with each other during the torque control and the differential torque between the MG1 torque command value Tg and the torque Tgeq balanced with the clutch torque command value Tclt is within a predetermined range. In addition, it is preferable that the differential torque between the MG1 torque command value Tg and the balanced torque Tgeq is a value on the side approximating the rotation speed of the ring gear 43 to the target rotation speed. In addition, it is preferable that the ECU 60 allows the magnitudes of the torque command values Tg, Tclt before the engine rotation speed Ne passes through the resonance band to exceed the magnitudes of the torque command values Tg, Tclt after the engine rotation speed Ne passes through the resonance band.

The rotation speed of the ring gear 43 at the initiation of the torque control is 0 and is less than the target rotation speed. Accordingly, the ECU 60 sets the differential torque (additional torque Tgnctgt) between the MG1 torque command value Tg and the balanced torque Tgeq after the engine rotation speed Ne passes through the resonance band. In the driving device 2-1 for a hybrid vehicle according to this embodiment, the first rotating machine MG1 and the first clutch CL1 are coaxial with each other, and thus the balanced torque Tgeq corresponds to the clutch torque command value Tclt. In other words, the MG1 torque command value Tg can be calculated by the following equation (5).

$$Tg = Tclt + Tgnctgt \tag{5}$$

The ECU 60 sets the differential torque by increasing or decreasing the MG1 torque command value Tg with respect to the torque balanced with the clutch torque command value Tclt as shown by the above equation (5). As in the first embodiment, it is preferable that the additional torque Tgnctgt becomes 0 and the MG1 torque command value Tg becomes the torque balanced with the clutch torque command value Tclt when the rotation speed of the ring gear 43 reaches the target rotation speed.

In addition, the ECU 60 inhibits the fluctuation of the output torque from the carrier 44, which is an output shaft, by outputting the reaction force cancellation torque to the second rotating machine MG2. It is preferable that the ECU 60 determines the reaction force cancellation torque command value Tep based on the torque command value with respect to the first clutch CL1 when the first clutch CL1 has yet to be fully engaged and determines the reaction force cancellation torque command value Tep based on the torque command value with respect to the first rotating machine MG1 after the first clutch CL1 is fully engaged.

The control according to the first embodiment and this embodiment may also be applied to another vehicle. For example, the control according to the first embodiment and this embodiment may also be applied to a vehicle which has an engine and one rotating machine mounted thereon and disengages a driving wheel and the rotating machine from the engine by the use of a clutch.

First Modification Example of Each Embodiment

The target engagement rotation speed Nctgt of the first embodiment and the second embodiment described above may be a single rotation speed or may be a constant rotation speed range. In addition, the target engagement rotation speed Nctgt may be change in accordance with a condition such as the speed of the vehicle. For example, the target engagement rotation speed Nctgt pertaining to a case where the speed of the vehicle is high may exceed the target engagement rotation speed Nctgt pertaining to a case where the speed of the vehicle is low. In a case where the speed of the vehicle is high, the power demand is likely to become high. When the target engagement rotation speed Nctgt is increased in this case, the power responsiveness with respect to a request can be improved. When the target engagement rotation speed Nctgt is decreased in the case of a low vehicle speed at which the power demand is relatively low, the timing at which the first clutch CL1 becomes fully engaged at an earlier timing.

Second Modification Example of Each Embodiment

In the first embodiment and the second embodiment described above, the differential torque is set by increasing or decreasing the MG1 torque command value Tg with respect to the torque Tgeq balanced with the clutch torque command value Tclt. However, the differential torque may also be set by increasing or decreasing the clutch torque command value Tclt based on the addition of the additional torque Tgnctgt to the torque balanced with the MG1 torque command value Tg. When the carrier rotation speed Nc and the rotation speed of the ring gear 43 reach the target rotation speed in this case, the clutch torque command value Tclt may become the torque balanced with the MG1 torque command value Tg with the additional torque Tgnctgt becoming 0.

Third Modification Example of Each Embodiment

The additional torque Tgnctgt may be variable. For example, a different value may be adopted as the value of the additional torque Tgnctgt depending on conditions and the adopted value of the additional torque Tgnctgt may be fixed during the torque control with respect to the first rotating machine MG1 and the first clutch CL1. Alternatively, the value of the additional torque Tgnctgt may change during the torque control with respect to the first rotating machine MG1 and the first clutch CL1.

Fourth Modification Example of Each Embodiment

In the first embodiment and the second embodiment described above, the additional torque Tgnctgt is added when the MG1 torque command value Tg is calculated during the torque control. However, the additional torque Tgnctgt may not be added in some cases. For example, the MG1 torque command value Tg may be calculated without the addition of the additional torque Tgnctgt in a case where the carrier rotation speed at start request Ncini is equal to the target engagement rotation speed Nctgt (the rotation speed difference is less than a predetermined value). Likewise, the additional torque Tgnctgt may not be added even regarding a case where the additional torque Tgnctgt is added during the calculation of the clutch torque command value Tclt as in the second modification example described above.

What has been disclosed in each of the embodiments and modification examples described above may be executed in an appropriate combination.

REFERENCE SIGNS LIST 1-1, 2-1 . . . DRIVING DEVICE FOR HYBRID VEHICLE, 1 . . . ENGINE, 10 . . . FIRST PLANETARY GEAR MECHANISM (DIFFERENTIAL MECHANISM), 14 . . . FIRST CARRIER (PREDETERMINED ROTATING ELEMENT), 32 . . . DRIVING WHEEL, 40 . . . PLANETARY GEAR MECHANISM (DIFFERENTIAL MECHANISM), 43 . . . RING GEAR (PREDETERMINED ROTATING ELEMENT), 50, 60 . . . ECU, CL1 . . . FIRST CLUTCH (CLUTCH), Nc . . . CARRIER ROTATION SPEED, Ne . . . ENGINE ROTATION SPEED, Ncini . . . CARRIER ROTATION SPEED AT START REQUEST, Nctgt . . . TARGET ENGAGEMENT ROTATION SPEED (TARGET ROTATION SPEED), Tclt . . . CLUTCH TORQUE COMMAND VALUE, Tep . . . REACTION FORCE CANCELLATION TORQUE COMMAND VALUE, Tg . . . MG1 TORQUE COMMAND VALUE, Tgeq . . . BALANCED TORQUE, Tgnctgt . . . ADDITIONAL TORQUE

The invention claimed is:

1. A driving device for a hybrid vehicle, the hybrid vehicle including: a differential mechanism, a first rotating machine connected to the differential mechanism, a second rotating machine connected to the differential mechanism, and an engine connected to a predetermined rotating element of the differential mechanism via a clutch, the driving device comprising an electronic control unit configured to
   (i) execute torque control for the first rotating machine and the clutch until a rotation speed of the predetermined rotating element reaches a target rotation speed in a case where the engine is started in a state where the clutch is released, and
   (ii) control and output respective torque command values with respect to the first rotating machine and the clutch during the torque control such that a differential torque, which is a difference between:
      (a) a balanced torque value using a first torque command value; and
      (b) a second torque command value;
   wherein said differential torque is a value within a predetermined range, and the first torque command value being a command value with respect to one of the first rotating machine and the clutch and the second torque command value being a command value with respect to the other one of the first rotating machine and the clutch.

2. The driving device according to claim 1, wherein the differential torque during the torque control is based on a magnitude relation between the target rotation speed of the predetermined rotating element available when the clutch is fully engaged and the rotation speed of the predetermined rotating element available when the torque control is initiated, and
the differential torque is a value on a side approximating the rotation speed of the predetermined rotating element to the target rotation speed.

3. The driving device according to claim 1, wherein a magnitude of the torque command value until a rotation speed of the engine passes through a resonance band is larger than a magnitude of the torque command value after the rotation speed of the engine passes through the resonance band, during the torque control, and
wherein the electronic control unit is configured to
(i) set the differential torque after the rotation speed of the engine passes through the resonance band in a case where the rotation speed of the predetermined rotating element available when the torque control is initiated is lower than the target rotation speed, and
(ii) set the differential torque even before the rotation speed of the engine passes through the resonance band in a case where the rotation speed of the predetermined rotating element available when the torque control is initiated is higher than the target rotation speed.

4. The driving device according to claim 1, wherein the hybrid vehicle is configured to output torque inhibiting an output torque fluctuation attributable to the engagement of the clutch by using the second rotating machine, and
wherein the electronic control unit is configured to
(i) determine the inhibiting torque based on the torque command value with respect to the clutch when the clutch has yet to be fully engaged, and
(ii) determine the inhibiting torque is based on the torque command value with respect to the first rotating machine after the clutch is fully engaged.

5. The driving device according to claim 1, wherein the electronic control unit is configured to
(i) set the differential torque by increasing or decreasing the torque command value with respect to the first rotating machine with respect to the torque balanced with the torque command value with respect to the clutch, and
(ii) allow the torque command value with respect to the first rotating machine to become the torque balanced with the torque command value with respect to the clutch when the rotation speed of the predetermined rotating element reaches the target rotation speed.

* * * * *

UNITED STATES PATENT AND TRADEMARK OFFICE
CERTIFICATE OF CORRECTION

PATENT NO. : 9,663,094 B2
APPLICATION NO. : 14/787861
DATED : May 30, 2017
INVENTOR(S) : Yasuhiro Oshiumi Page 1 of 1

It is certified that error appears in the above-identified patent and that said Letters Patent is hereby corrected as shown below:

In the Claims

At Column 20, Line 42, change "torque is based on" to "torque based on"

Signed and Sealed this
Twenty-second Day of May, 2018

Andrei Iancu
*Director of the United States Patent and Trademark Office*